Figure 1:
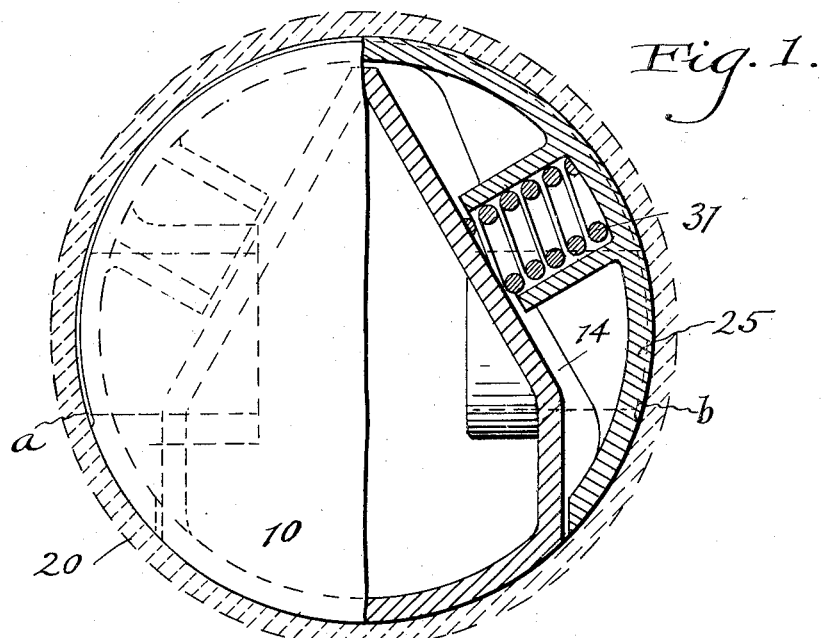

A. P. BRUSH.
ENGINE PISTON.
APPLICATION FILED MAR. 1, 1919.

1,338,169.

Patented Apr. 27, 1920.
2 SHEETS—SHEET 1.

Inventor
Alanson P. Brush
By
Thurston & Kwis & Hudson
attys.

UNITED STATES PATENT OFFICE.

ALANSON P. BRUSH, OF DETROIT, MICHIGAN.

ENGINE-PISTON.

1,338,169.  Specification of Letters Patent.  Patented Apr. 27, 1920.

Application filed March 1, 1919. Serial No. 280,124.

*To all whom it may concern:*

Be it known that I, ALANSON P. BRUSH, a citizen of the United States, residing at Detroit, in the county of Wayne and State of Michigan, have invented a certain new and useful Improvement in Engine-Pistons, of which the following is a full, clear, and exact description.

One object of this invention is to provide a piston which will have and will maintain a substantially leakless sliding fit in its cylinder. Another object is to provide a piston which will not "slap" in its cylinder.

The invention consists in the construction and combination of parts shown in the drawing and hereinafter described and as defined by the appended claims.

Figure 2:
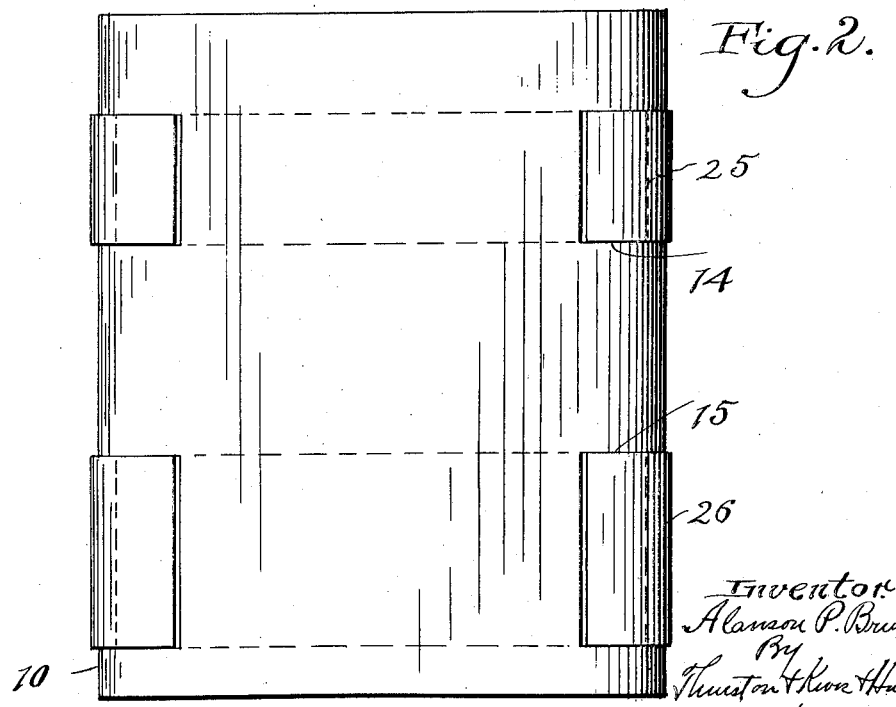
Figure 3:
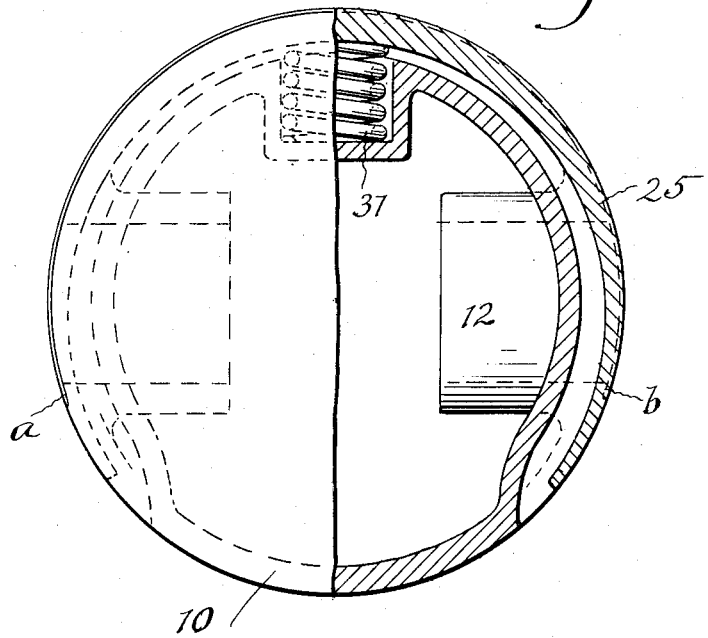
Figure 4:
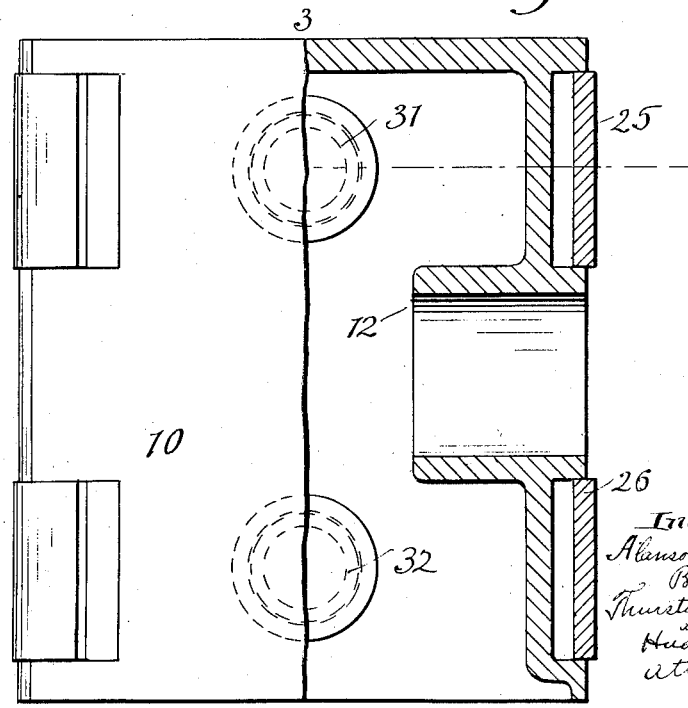

In the drawing, Figure 1 is a transverse section through one form of said piston and its cylinder, in the plane of line 1—1 on Fig. 2. Fig. 2 is a side view of the piston shown in Fig. 1. Fig. 3 is a transverse sectional view of a modified form of the piston,—the section being in the plane of line 3—3 on Fig. 4. Fig. 4 is a side view,—one half in elevation and one half in central longitudinal section.

Referring to the parts shown by reference characters, 10 represents the piston body. This is a hollow shell which is closed at one end, and it is formed with two diametrically disposed piston pin bosses.

The surface of the piston body from end to end and for less than one half of the circumference,—viz: the part between points marked $a$ and $b$ and below them, as shown on Figs. 1 and 3, is cylindrical, and of substantially the same diameter as the bore of the cylinder 20 in which it has a nice sliding fit; but the remainder of the piston, more than half of its surface,—viz: the part shown above the points marked $a$ and $b$ on Figs. 1 and 3, is of smaller diameter, so that even when the piston is expanded it will not touch,—or if it does, will very lightly touch the cylinder wall. The part of the piston shown below the letters $a$ and $b$ will be called the fitting portion, while the part above said letters will be called the non-fitting portion of the piston.

Two circumferentially extended packing grooves 14, 15, are formed in the non-fitting portion of the piston, and these grooves at both ends are extended a substantial distance,—say an inch more or less, into the fitting portion of the piston.

The packing crescents 25 and 26 are respectively fitted in said grooves,—the upper and lower edges of said packing crescents having nice sliding engagements with the upper and lower walls of said grooves, and the ends of said packing crescents extending well into those parts of the grooves 14, 15, which are in the fitting portion of the piston.

These packing crescents, are normally of larger diameter than the cylinder and therefore have to be contracted to get them into the cylinder. These packing crescents are resilient, either inherently, as with the construction shown in Figs. 3 and 4, or because of the action thereon of the springs 31, 32, as shown in Figs. 1 and 2.

Interposed between the packing crescents and the bottom of the grooves in which they are fitted is a spring, (or springs) which act to thrust the piston and packing crescents apart in a direction at right angles to the diametrical plane which includes the axis of the piston pin bosses. In the construction which is shown in Figs. 1 and 2 there are two springs which not only act to move the packing crescent relative to the piston, as stated, but they also act to swing the ends of the packing crescent out into contact with the cylinder wall. The external surface of these packing crescents, from one end thereof to the other are yieldingly pressed into engagement with the cylinder wall, and so also is the fitting portion of the piston. The ends of the packing crescents overlap the edges of the fitting portion of the piston, and therefore no leakage can take place past the piston when constructed as above stated. Neither can the piston move rapidly across from one side of the cylinder to the other as the connecting rod changes its inclination as do sometimes the pistons which have the ring packing,—thereby causing the noise called piston slap.

Having described my invention, I claim:

1. The combination of a piston body having a cylinder fitting portion and a non-fitting portion, and having a circumferentially extended packing groove which goes entirely across the nonfitting portion and extends at both ends into the fitting portion of said piston body, a resilient expansible packing crescent which is fitted in said groove, and means yieldingly thrusting the piston and the packing crescent apart so that they will contact with the walls of a cylinder in which the parts are placed.

2. The combination of a piston body having two diametrically opposed piston pin bosses and having a cylinder fitting portion which extends less than half way around the piston and a nonfitting portion which extends more than half way around the piston between and beyond the diametrical plane which includes the axis of the piston bosses, a resilient expansible packing crescent which is fitted to said groove, and means yieldingly thrusting the piston and packing ring apart.

3. The combination of a cylinder, a piston body therein having a portion which fits the piston which portion comprises less than half the cylinder body and having a nonfitting portion which comprises the remainder and more than half the cylinder body, said piston body having a circumferentially extended packing slot which goes entirely across the nonfitting portion of the piston and at both ends into the fitting portion of the body, a packing crescent which is fitted to said groove, and a spring interposed between said packing crescent and piston body acting to thrust them apart.

In testimony whereof, I hereunto affix my signature.

ALANSON P. BRUSH.